(12) United States Patent
Jacobovitz-Veselka et al.

(10) Patent No.: US 6,310,899 B1
(45) Date of Patent: Oct. 30, 2001

(54) CASCADED RAMAN RESONATOR SYSTEM AND APPARATUS

(75) Inventors: Gloria R. Jacobovitz-Veselka, Morganville; William Alfred Reed, Summit, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/145,324

(22) Filed: Sep. 1, 1998

Related U.S. Application Data

(60) Provisional application No. 60/081,825, filed on Apr. 15, 1998.

(51) Int. Cl.[7] ............................................. H01S 3/30
(52) U.S. Cl. ........................... 372/6; 372/3; 372/99
(58) Field of Search ........................... 385/24, 37; 372/6, 372/3, 99

(56) References Cited

U.S. PATENT DOCUMENTS

| | | | |
|---|---|---|---|
| 5,323,404 | 6/1994 | Grubb | 372/6 |
| 5,815,518 | * 9/1998 | Reed | 372/6 |
| 5,887,093 | * 3/1999 | Hansen | 385/27 |

* cited by examiner

*Primary Examiner*—Teresa M. Arroyo
*Assistant Examiner*—Gioacchino Inzirillo
(74) *Attorney, Agent, or Firm*—John M. Harman

(57) ABSTRACT

Embodiments of the invention include an optical fiber laser system with a cascaded Raman resonator (CRR) or other suitable Raman frequency shifting device having a length of optical fiber with at least one input pump reflector, a series of Raman-Stokes order reflectors and an output reflector therein. The reflectors are written to provide sufficient conversion efficiency despite the use of the cascaded Raman resonator with differing pump laser wavelengths. The reflectors are written not necessarily in correspondence with the gain maxima of the intermediate Stokes orders, but instead are written to reflect with less than maximum gain conversion intensity, yet in a manner that allows different pump laser wavelengths to be converted thereby. When operating the cascaded Raman resonators at sufficiently high pump powers, input pump reflectors are not necessary. Cascaded Raman resonators designed in accordance with embodiments of the invention are useful with different pump laser wavelengths. For example, 1480 nm cascade Raman resonators, which conventionally are used only with 1117 nm pump lasers, are useful according to embodiments of the invention with 1100 nm pump lasers as well. Similarly, 1450 nm cascaded Raman resonators, which conventionally are used only with 1110 nm pump lasers, are useful according to embodiments of the invention with 1117 nm pump lasers as well. Amplification devices according to embodiments of the invention are power scaleable in a manner sufficient to provide optical fiber amplification at a desired output wavelength for a given plurality of pump lasers having different operating wavelengths. Also, the devices according to embodiments of the invention are less complex and expensive than conventional arrangements.

10 Claims, 3 Drawing Sheets

CASCADED RAMAN RESONATOR SYSTEM AND APPARATUS

CROSS-REFERENCE TO RELATED APPLICATION

This application claims priority of U.S. Provisional Application Ser. No. 60/081,825, filed Apr. 15, 1998.

BACKGROUND OF THE INVENTION

1. Field of the Invention

The invention relates to optical amplifiers and lasers. More particularly, the invention relates to optical amplifier and laser apparatus and methods using cascaded Raman resonators.

2. Description of the Related Art

Optical amplifiers and lasers are used within optical communications systems to compensate for losses incurred throughout the system. Optical amplifiers often include a Raman amplifier or laser to pump light at a particular wavelength. See, e.g., U.S. Pat. No. 5,323,404, which is assigned to the instant assignee and hereby is incorporated by reference herein.

In general, Raman amplifiers and Raman lasers are based on stimulated Raman scattering, a non-linear optical process that involves converting light from an optical source to the vibrational modes of a non-linear optical transmission medium (e.g, an optical fiber, typically a silica-based optical fiber) and re-radiation at a different (typically longer) wavelength.

For example, a cascaded Raman laser typically is a Raman laser with a non-linear optical transmission medium that has, in addition to a pair of reflectors that defines an optical cavity for radiation of an output wavelength $\lambda_n$, at least one Raman-Stokes order reflector pair defining a corresponding optical cavity for radiation of wavelength $\lambda_{n-1} < \lambda_n$, where $n \geq 2$. The reflector pairs are, e.g., Bragg gratings, etched gratings or in-line refractive index gratings. When fused silica is used as the non-linear medium, the maximum Raman gain occurs at a frequency shift of 13.2 terahertz (THz), which corresponds to a wavelength shift of approximately 50–100 nanometers (nm) for pump wavelengths between approximately 1.0 and 1.5 microns ($\mu$m).

A cascaded Raman resonator (CRR) includes a non-linear optical transmission medium to generate Raman laser energy at a specific output wavelength ($\lambda_n$). More specifically, the cascaded Raman resonator converts light from an optical source such as a pump laser operating at a pump wavelength ($\lambda_p$) to the desired output wavelength ($\lambda_n$). Suitable applications of such cascaded Raman resonator include, e.g., remotely pumped erbium (Er) fiber amplifiers in repeaterless optical fiber communication systems.

However, conventional cascaded Raman resonators typically require optical sources that operate at a specific pump wavelength ($\lambda_p$) depending on the cascaded Raman resonator output wavelength ($\lambda_n$) desired. For example, a cascaded Raman resonator having an output wavelength ($\lambda_n$) of 1480 nm typically is useful only with an optical source such as a pump laser operating at a pump wavelength ($\lambda_p$) of 1117 nm, which corresponds to a series of resonators spaced at wavelengths corresponding to the maximum Raman gains or frequency shifts of about 13.5 THz. Similarly, a cascaded Raman resonator having an output wavelength ($\lambda_n$) of 1450 nm typically is useful only with an optical source such as a pump laser operating at a pump wavelength ($\lambda_p$) of 1100 nm.

Thus, it would be desirable to have available Raman laser devices that are power scaleable and more independent of the device input wavelength ($\lambda_p$). Such devices would be more versatile in that, e.g., the devices would not be limited to use with sources having only a specific pump wavelength ($\lambda_p$) that corresponds to a Raman-Stokes order that leads to the desired output wavelength ($\lambda_n$) of the device.

SUMMARY OF THE INVENTION

The invention is embodied in an apparatus for converting light within an optical fiber communications system. Embodiments of the invention provide a cascaded Raman resonator (CRR) or other suitable Raman frequency shifting device having an optical energy transmission medium with a series of Raman-Stokes order reflectors and an output reflector therein. One or more of the reflectors are written to provide conversion with less than maximum efficiency, but sufficient efficiency to allow different pump laser wavelengths to be converted thereby. For example, the reflectors within the cascaded Raman resonator are written at wavelengths that are not necessarily at the maximum of the Raman gain for the pump wavelength ($\lambda_p$) but still provide sufficient conversion efficiency In one embodiment of the invention, a cascaded Raman resonator includes an optical fiber with an optical cavities defined by a pump reflector and a pair of highly reflective gratings whose maximum reflectance wavelength does not correspond to the wavelength where the theoretical maximum Raman gain occurs but is within an acceptable range for sufficient conversion efficiency. Alternatively, one or more of the reflectors in the series of intermediate Raman-stokes reflectors and the low reflectivity output reflector are not necessarily written at wavelengths that correspond to the theoretical maximum Raman gain but are within acceptable ranges thereof for sufficient conversion efficiency.

According to another alternative embodiment of the invention, the cascaded Raman resonator does not use a pump reflector. More specifically, when operating at sufficiently high pump powers, e.g., greater than approximately 4 watts, sufficient conversion exists over approximately the first 500 meters of fiber that the pump reflector, typically written within at the pump wavelength ($\lambda_p$), is not necessary.

Cascaded Ramam resonators designed in accordance with embodiments of the invention are useful with different pump lasers having different pump wavelengths ($\lambda_p$). For example, 1480 nm cascaded Raman resonators, which conventionally convert optical energy from 1117 nm pump lasers to an output signal wavelength of 1480 nm, also are useful for converting optical energy from, e.g., 1100 nm pump lasers to the output signal wavelength of 1480 nm.

Alternatively, when operated at low pump powers, e.g., less than approximately 4 watts, 1480 nm cascaded Raman resonators (CRR) include an additional high reflectance grating written at approximately 1100 nm to reflect the non-absorbed light. In this manner, 1480 nm cascaded Raman resonators are useful with, e.g., 1100 nm pump laser sources in addition to 1117 nm pump lasers. In conventional arrangements, 1100 nm pump lasers typically are used only with 1450 nm cascaded Raman resonators, which conventionally are designed to convert optical energy from 1100 nm pump lasers to an output signal wavelength of 1450 nm.

Also, in a similar manner, according to embodiments of the invention, 1450 nm cascaded Raman resonators, which conventionally convert optical energy from 1100 nm pump lasers to an output signal wavelength of 1450 nm, also are useful in converting optical energy from 1117 nm pump lasers to the output signal wavelength of 1450 nm. Alternatively, when operated at low pump powers, e.g., less than approximately 4 watts, 1450 nm cascaded Raman resonators include an additional high reflectance grating written at approximately 1117 nm to reflect the non-absorbed light. In conventional arrangements, 1117 nm pump lasers typically are used only with 1480 nm cascaded Raman resonators, which conventionally are designed to convert optical energy from 1117 nm pump lasers to an output signal wavelength of 1480 nm.

Cascaded Raman resonator (CRR) devices according to embodiments of the invention are power scaleable in a manner sufficient to provide adequate optical power for a variety of application at a desired output wavelength for a given plurality of pump wavelengths. Also, the devices according to embodiments of the invention are less complex and less expensive than conventional arrangements.

BRIEF DESCRIPTION OF THE DRAWINGS

In the drawings:

FIG. 6a is a graphical diagram of light absorption versus optical fiber length for high pump powers;

DETAILED DESCRIPTION

Figure 1:
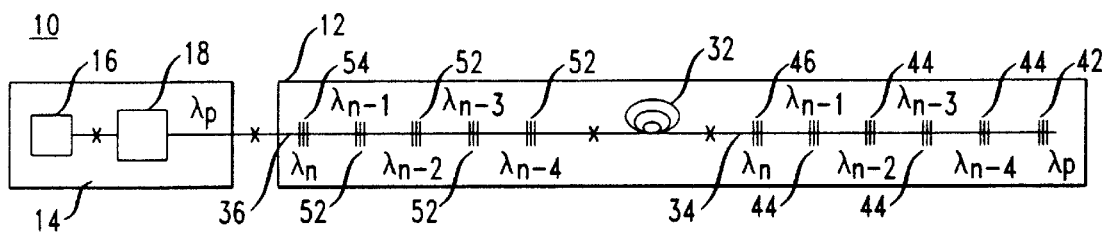
FIG. 1 is a simplified schematic diagram of a typical optical fiber laser system.

In the following description similar components are referred to by the same reference numeral in order to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Embodiments of the invention are based on the advantageous realization that light converted with less than theoretically maximum efficiency still is sufficient for many optical fiber laser applications. Accordingly, at least one of the reflective grand pairs written on the optical energy transmission medium contained within a Raman frequency shifting device is not necessarily written in direct correspondence with the theoretical maximum gain of the intermediate Stokes orders. Such realization is used to fabricate, e.g., cascaded Raman resonators (CRR) and other suitable optical conversion devices that are power scaleable in a manner sufficient to provide optical fiber amplification (via Raman shifts) at a desired output wavelength for a given plurality of pump lasers operating at different pump wavelengths.

Also, embodiments of the invention are based on the advantageous realization that with respect to pumped light versus optical fiber length at sufficient pump powers, for high pump powers, e.g., greater than approximately 4 watts, the pumped light is significantly if not effectively completely absorbed in the first hundred meters of the optical fiber. Therefore, when operating at such high pump powers, a pump reflector often is not needed within the optical conversion device.

Referring now to FIG. 1, an optical fiber laser system 10 is shown. The optical fiber laser system 10 includes, e.g., a cascaded Raman resonator (CRR) 12 that is adapted for receiving optical energy from a pump laser 14 at a pump wavelength of $\lambda_p$ and converting the optical energy to output optical energy at an output wavelength of $\lambda_n$. The pump laser includes, e.g., a high power diode laser 16 and a cladding pumped fiber laser 18. The components of the pump laser 14 are given for illustration purposes only and are not meant to be a limitation of embodiments of the invention. It should be understood that, in accordance with embodiments of the invention, the pump laser 14 can have conventional structure. A suitable pump laser is, e.g., a 1117 nanometer (nm) cladding pumped fiber laser (CPFL) manufactured by SDL, Inc.

The cascaded Raman resonator 12 includes a length of optical fiber 32 or other suitable optical transmission medium having at least one reflective grating set written to an output region 34 thereof and at least one reflective grating set written to an input region 36 thereof. The reflective gratings are, e.g., Bragg gratings, etched gratings, in-line refractive index gratings or other suitable highly reflective fiber reflecting means. From another perspective, the cascaded Raman resonator 12 shown in FIG. 1 includes a set or plurality of matched fiber Bragg gratings spliced to both ends of the fiber 32.

The fiber grating set written to the output region 34 of the optical fiber 32 includes, e.g., at least one highly reflective pump grating 42 whose maximum reflectance wavelength is approximately equal to the pump wavelength ($\lambda_p$) from the pump laser 14. Also, the output fiber grating set includes highly reflective gratings 44 whose maximum reflectance wavelengths essentially correspond to wavelengths within the intermediate Stokes orders ($\lambda_{n-1}$, $\lambda_{n-2}$, $\lambda_{n-3}$, . . . ) that correspond to maximum gain. The output fiber grating set also includes at least one low reflectance or transmissive grating 46 whose minimum reflectance is approximately equal to the desired output wavelength ($\lambda_n$) of the optical fiber laser system 10.

The fiber grating set written to the input region 36 of the optical fiber 32 includes highly reflective gratings 52 whose maximum reflectance wavelengths essentially correspond to wavelengths within the intermediate Stokes orders ($\lambda_{n-1}$, $\lambda_{n-2}$, $\lambda_{n-3}$, . .) that correspond to maximum gain. Also, the input fiber grating set includes at least one highly reflective grating 54 whose maximum reflectance wavelength is approximately equal to the desired output wavelength ($\lambda_n$).

As was discussed previously herein, the maximum gain of the intermediate Stokes orders occurs at frequency shifts of about 13.2 terahertz (THz), starting at, e.g., the operating wavelength of the pump laser ($\lambda_p$). Shifts of 13.2 THz correspond to a wavelength shifts of approximately 50–100 nanometers (nm) for pump wavelengths between approximately 1.0 and 1.5 microns ($\mu$m). The power of the intermediate Raman-Stokes orders is circulated into the cavity of the cascaded Raman resonator 12 until it is almost entirely converted into the successive Raman-Stokes orders. For example, in operation, the optical fiber laser system 10 shown in FIG. 1 receives from the pump laser 14 at the pump wavelength $\lambda_p$ and efficiently converts the optical energy to output optical energy at an output wavelength $\lambda_n$.

Figure 2A:
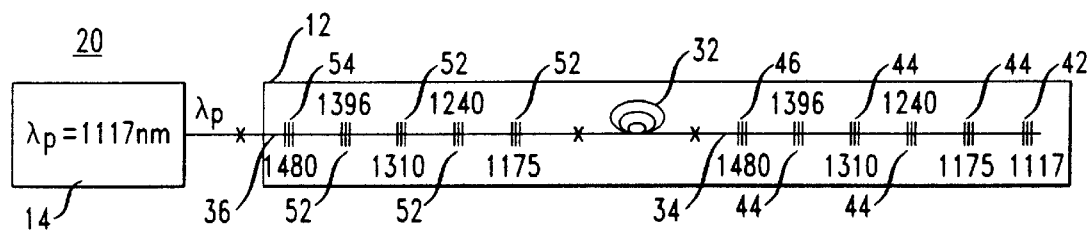
FIGS. 2a–b are simplified schematic diagrams of conventional optical fiber laser system arrangements.

Referring now to FIG. 2a, conventional optical fiber laser system arrangement 20 is shown. The arrangement 20 includes a pump laser 14 having an input, operating or pump wavelength ($\lambda_p$) of approximately 1117 nm. The pump laser 14 is connected, e.g., by a splice (indicated generally by "x") to a cascaded Raman resonator (CRR) 12.

The cascaded Raman resonator 12 includes a length of optical fiber 32 having an output region 34 with at least one refractive index grating written thereto and an input region 36 with at least one refractive index grating written thereto. The output region 34 includes a plurality of highly reflective gratings 44 with center wavelengths of approximately 1175 nm, 1240 nm, 1310 nm and 1396 nn. The output region 34 also includes a pump reflector, e.g., in the form of a high reflectance grating 42, having a maximum reflectance wavelength of approximately 1117 nm, which is, e.g., approximately equal to the operating wavelength $\lambda_p$ of the pump laser 14. The output fiber grating set also includes at least one low reflectance or transmissive grating 46 whose minimum reflectance is approximately equal to the desired output wavelength ($\lambda_n$) of the optical fiber laser system 20.

The input region 36 includes a plurality of highly reflective gratings 52 with center wavelengths of approximately 1175 nm, 1240 nm, 1310 nm and 1396 nm. The input region 36 also includes at least one highly reflective gating 54, whose maximum reflectance is 1480 nm, i.e., approximately equal to the desired output wavelength $\lambda_n$.

The reflective gratings 52 of the input region 36 combine with the corresponding reflective gratings 44 of the output region 34 to define optical cavities therebetween that allow for the Raman scattering, as disclosed previously herein. More specifically, the reflective gratings 44, 52 are written so that their center wavelengths correspond to the intermediate Raman-Stokes orders between the pump wavelength ($\lambda_p$=1117 nm) and the output wavelength ($\lambda_n$=1480 nm). In operation, the conventional arrangement of FIG. 2a converts input optical energy having an input or pump wavelength of 1117 nm to output optical energy having a wavelength of 1480 nm.

Figure 2B:
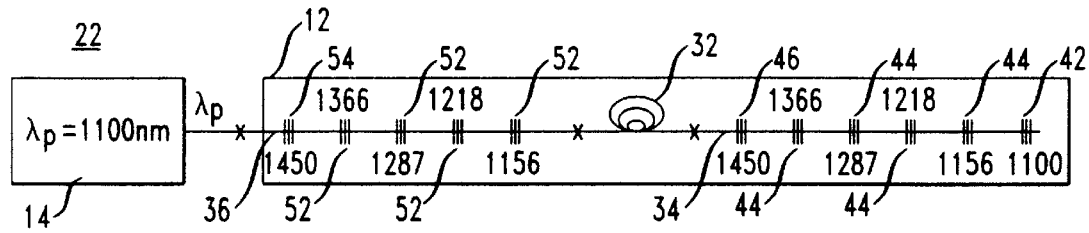

Referring now to FIG. 2b, a conventional optical fiber arrangement 22 using a pump laser 14 having a wavelength ($\lambda_p$) of approximately 1100 nm is shown. The arrangement 22 also includes a cascaded Raman resonator 12 operably connected thereto, e.g., by a splice (indicated generally by "x").

The cascaded Raman resonator 12 includes an optical fiber 32 having an output region 34 and an input region 36. The output region 34 includes a plurality of highly reflective gratings 44 with center wavelengths of approximately 1156 nm, 1218 nm, 1287 nm, and 1366 nm, and a pump reflector, e.g., in the form of a high reflectance grating 42, having a maximum reflectance wavelength of approximately 1100 nm (the operating or pump wavelength $\lambda_p$ of the pump laser 14). The output fiber grating set also includes at least one low reflectance or transmissive grating 46 whose minimum reflectance is approximately equal to the desired output wavelength ($\lambda_n$) of the optical fiber laser system 20.

The input region 36 includes a plurality of highly reflective gratings 52 with center wavelengths of approximately 1156 nm, 1218 nm, 1287 nm and 1366 nm. The region 36 also includes at least one highly reflective grating 54, whose maximum reflectance is 1480 nm, i.e., approximately equal to the desired output wavelength $\lambda_n$.

The reflective index gratings written to the input and output regions 36, 34 of the optical fiber 32 are written so that the respective maximum reflectance wavelengths (i.e., their center wavelengths) correspond to the intermediate Raman-Stokes orders (i.e., 1156 nm, 1218 nm, 1287 nm, 1366 nm) between the input pump wavelength (1100 nm) and the output wavelength (1450 nm). In operation, the optical fiber arrangement 22 shown in FIG. 2b converts input optical energy having an input or pump wavelength of 1100 nm to output optical energy having a wavelength of 1450 nm.

As should be evident from the previous discussion of the conventional arrangements shown in FIGS. 2a–b, in conventional arrangements, the input and output regions 36, 34 are configured to be useful only with an input source having a specific operating wavelength. For example, the arrangement 20 shown in FIG. 2a is useful only with a pump laser 14 having an operating (pump) wavelength $\lambda_p$ of approximately 1117 nm. Similarly, the arrangement 22 shown in FIG. 2b is useful only with a pump laser 14 having a operating (pump) wavelength $\lambda_p$ of approximately 1100 nm. Thus, in order to obtain a different desired output wavelength $\lambda_n$, a different input wavelength (and thus a different pump laser) is required. Therefore, in conventional arrangements, cascaded Raman resonators typically are useful only with a single pump laser operating at a certain wavelength.

From an economic perspective, the cascaded Raman resonator represents approximately 40% of the total cost of the overall optical fiber laser system arrangement. Therefore, the pump laser contributes approximately 60% of the total cost, and each additional pump laser required in addition to the initial pump laser adds an additional 60% to the overall cost of the of the optical fiber laser system.

According to embodiments of the invention, light is converted using stimulated Raman scattering at wavelengths characterized by less than maximum but sufficient conversion efficiency for many optical fiber laser applications. In this manner, the usefulness of optical energy sources such as pump lasers is expanded advantageously. For example, pump lasers that conventionally were useful only with a single cascaded Raman resonator (CRR) configuration, are, according to embodiments of the invention, useful with multiple cascaded Raman resonator (CRR) configurations.

Figure 3:
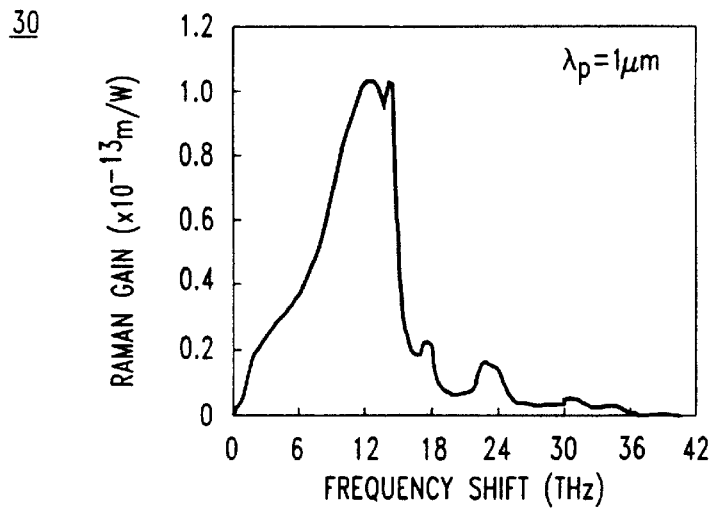
FIG. 3 is a graphical diagram of the Raman gain spectrum for an optical transmission medium of fused silica fiber and a pump wavelength of approximately 1 $\mu$m.

Referring now to FIG. 3, a graph 30 of the Raman gain spectrum is shown. From the graph 30, it is seen that Raman gain occurs for frequency shifts up to 42 THz with the "practical" Raman gain spectrum extending from approximately 3 THz until 15 THz, but with less efficient operation than is achievable at a frequency shift corresponding to the maximum Raman gain. Therefore, according to embodiments of the invention, cascaded Raman resonators and other suitable optical fiber laser devices are configured in such a way that the frequency shifts of the resonant cavities fall within this frequency range, but not necessarily at the frequency that provides the theoretically maximum conversion efficiency. More specifically, one or more gratings or other reflective means are written so that their center wavelengths do not necessarily correspond to the maximum gain of the Raman-Stokes orders. Such configurations expand the usefulness of cascaded Raman resonators and other suitable devices in certain applications to the extent that, e.g., devices designed for a pump laser or other optical energy source operating at a specific wavelength are useful with sources that operate at other wavelengths.

For example, in accordance with embodiments of the invention, cascaded Raman resonators have pump reflectors, output reflectors and Raman-Stokes order reflectors that take into account non-maximized but sufficient frequency shifts within the illustrated frequency range. That is, one or more of the grating pairs that form these reflectors are not necessarily written in correspondence with maximum gain of the intermediate Stokes orders of one or more pump laser operating wavelengths. However, the gratings are written within acceptable ranges of the theoretical maximum reflectance wavelengths, therefore allowing less efficient but still sufficient light conversion from an input or pump wavelength $\lambda_p$ to a desired output wavelength $\lambda_n$. In this manner, a single cascaded Raman resonator is flexible enough to convert light to a desired output wavelength $\lambda_n$ from more than one pump laser wavelength (e.g., $\lambda_{p1}$, $\lambda_{p2}$), unlike conventional cascaded Raman resonator arrangements.

Figure 4:
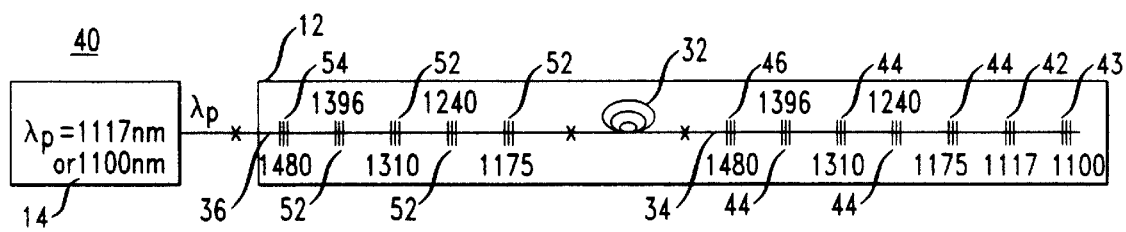
FIG. 4 is a simplified schematic diagram of an optical fiber laser system according to an embodiment of the invention.

Referring now to FIG. 4, an optical fiber laser system arrangement 40 according to an embodiment of the invention is shown. The arrangement 40 includes an optical energy source such as pump laser 14 having an input or pump wavelength ($\lambda_p$) of, e.g., 1100 nm, 1117 nm or other suitable wavelength, e.g., within the range from approximately 1085 nm to 1130 nm. The pump laser 14 is connected to a cascaded Raman resonator (CRR) 12, e.g., by a splice (indicated generally by "x").

The cascaded Raman resonator 12 includes an optical transmission medium such as an optical fiber 32 having an output region 34 and an input region 36. The output region 34 includes a pump reflector, e.g., in the form of a high reflectance grating 42, written within the output region 34 with the maximum reflectance occurring at a wavelength of approximately 1117 nm As will be discussed in greater detail hereinbelow, the high reflectance pump grating 42 makes it possible for the cascaded Raman resonator 12 to provide 1480 nm lasing for an input wavelength of 1117 nm (i.e., a 1117/1480 CRR).

According to an alternative embodiment of the invention, the output region 34 also includes another pump reflector, e.g., in the form of a high reflectance grating 43, written within the output region 34 with the maximum reflectance occurring at a wavelength of approximately 1100 nm. As will be discussed in greater detail hereinbelow, the high reflectance pump grating 42 and/or the high reflectance grating 43 allows the cascaded Raman resonator 12 to provide 1480 nm lasing for an input wavelength of 1110 nm (i.e., a 1100/1480 CRR).

The output region 34 also includes a plurality of reflective gratings 44 written within the output region 34 design to reflect at wavelengths that at least roughly correspond to Raman-Stokes order wavelength shifts. For example, as shown, the reflective gratings 44 in the output region 34 have center wavelengths of approximately 1175 nm, 1240 nm, 1310 nm and 1396 nm. However, according to embodiments of the invention, one or more of the reflective gratings 44 are written, e.g., so that their center wavelengths do not correspond to the maximum gain of the Raman-Stokes order wavelength shifts, but rather correspond to shifts within approximately ±20 nm of the theoretical Raman shifts for maximum gain, which provide less than theoretically ideal but still enough conversion efficiency for the given application.

The output region 34 also includes at least one low reflectance or transmissive grating 46 whose minimum reflectance is approximately equal to the desired output wavelength ($\lambda_n$) of the optical fiber laser system 40, e.g., approximately 1480 nm, which corresponds to the Raman-Stokes order wavelength shift. However, according to embodiments of the invention, the low reflectance or transmissive grating 46 is written, e.g., so that its maximum reflectance does not correspond to the gain maximum of the Raman-Stokes order wavelength shift (1480 nm), i.e., 1480 nm ±20 nm.

It should be noted that, according to embodiments of the invention, although one or more of the gratings 52 in the input region 36 and gratings 44 in the output region 34 do not correspond to the gain maxima of the Raman-Stokes orders, they should still match or complement one another. That is, gratings 52, 44 should still define optical cavities as before. For example, if a grating 44 in the output region is written for maximum reflectance at, e.g., 1245 nm (instead of the theoretical 1240 nm), then the corresponding grating 52 in the input region 36 should likewise be written for maximum reflectance at 1245 nm. In this manner, the defined optical cavity needed for proper Raman scattering is maintained.

The input region 36 includes a plurality of highly reflective gratings 52 written to match or complement the plurality of reflective gratings 44 in the output region 34, i.e., to correspond at least roughly to the Raman-Stokes order wavelength shifts. More specifically, both the reflective gratings 44 and the reflective gratings 52 are written to have center wavelengths of approximately 1175 nm, 1240 nm, 1310 nm and 1396 nm.

The input region 36 also includes a high reflectance output reflector, e.g., in the form of a high reflectance grating 54. The high reflectance grating 54 is written within the input region 36 so that the maximum reflection of the high reflectance grating occurs at approximately the desired output wavelength $\lambda_n$.

In operation, the reflective gratings 52 of the input region 36 combine with the corresponding reflective gratings 44 of the output region 34 to define optical cavities therebetween that allow for the Raman scattering, as disclosed previously herein. More specifically, the input optical energy from the pump laser 14 (e.g., having an input wavelength $\lambda_p$ of approximately 1110 nm or 1117 nm) propagates essentially unimpeded through the input region 36. The optical energy then is substantially converted to 1175 mm by Raman scattering in the region of the optical fiber 32 between the input region 36 and the output region 34. Any light that initially is not converted is reflected by the highly reflective grating 42 (1117 nm) and/or the highly reflective grating 43 (1110 nm) back into the optical cavity defined by the two 1175 nm gratings.

The (converted) 1175 nm light then is reflected back into the region of the optical fiber 32 between the input region 36 and the output region 34 by the two 1175 nm gratings, where it is substantially converted to 1240 nm by Raman scattering. The 1240 nm light then is reflected back into the region of the optical fiber 32 between the input region 36 and the output region 34 by the two 1240 nm gratings, where it is substantially converted to 1310 nm by Raman scattering. Similarly, the 1310 nm light is converted to 1396 nm and then to 1480 nm.

The (converted) 1480 nm light, which propagates at the desired output wavelength ($\lambda_n$), then is reflected by the highly reflective grating 54 in the input region 36. The 1480 nm light then passes through the low reflectance or transmissive grating 46 and the rest of the output region 34 to the output of the resonator 12.

In conventional arrangements, the high reflectance pump reflector grating is written to have maximum reflectance wavelengths approximately equal to the pump laser wavelength ($\lambda_p$). The Raman-Stokes order reflector gratings are written based on the theoretical maximum frequency shifts for maximum gain from the desired input wavelength ($\lambda_p$) and the low reflectance output reflector gratings are written to have satisfactory reflectance corresponding to the desired output wavelength ($\lambda_n$).

For example, in conventional arrangements, for a pump laser with an operating wavelength of 1100 nm, the pump reflector is written for maximum reflectance to occur at a wavelength of 1100 nm. Also, the Raman frequency shifts which correspond to maximum gain occur, e.g., at wavelengths of 1156 nm, 1218 nm, 1287 nm and 1366 nm and thus the Raman-Stokes order reflector gratings are written to correspond with these frequency shifts. Finally, the output reflector grating is written for minimum reflectance to occur at a wavelength of 1450 nm. See, e.g., FIG. 2a and the corresponding discussion hereinabove.

Similarly, in conventional arrangements, for a pump laser with an operating wavelength of 1117 nm, the pump reflector is written to have maximum reflectance at a wavelength of 1117 nm. Also, the Raman frequency shifts which correspond to maximum gain occur, e.g., at wavelengths of 1175 nm, 1240 nm, 1310 nm and 1396 nm and thus the Raman-Stokes order reflector gratings are written to correspond with these frequency shifts. The output reflector grating is written for minimum reflectance to occur at a wavelength of 1480 nm. See, e.g., FIG. 2b and the corresponding discussion hereinabove.

However, embodiments of the invention advantageously recognize that the Raman gain spectrum is approximately 60 nm wide. Therefore, for example, a pump laser operating at a wavelength of 1100 nm provides gain from, e.g., 1120 nm to 1180 nm. Such gain is within an acceptable range for cascaded Raman resonators designed for operation with, e.g., a 1117 nm pump laser (i.e., a 1117/1480 CRR), wherein the maximum gain for the first Raman shift from 1117 nm occurs at 1175 nm. Therefore, according to embodiments of the invention, a 1117/1480 CRR configured, e.g., as shown in FIG. 4, is capable of being pumped not only by a 1117 nm pump laser (as is conventionally done), but also by a 1110 nm pump laser as well.

Figure 5:
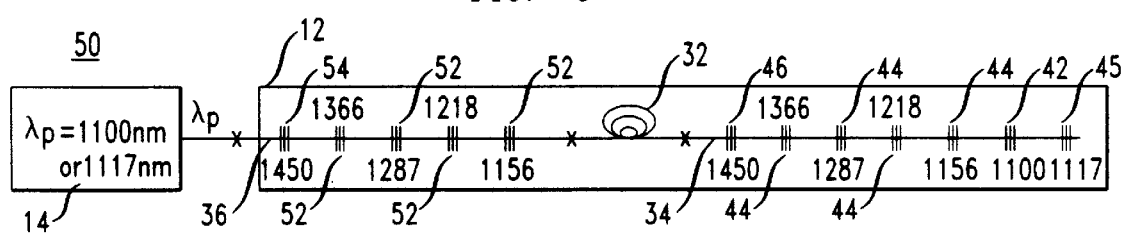
FIG. 5 is a simplified schematic diagram of an optical fiber laser system according to another embodiment of the invention.

Similarly, the 60 nm wide gain spectrum is sufficient for cascaded Raman resonators designed for operation with 1110 nm pump lasers (i.e., 1100/1450 CRRs) to be pumped not only by 1117 nm pump lasers (as is conventionally done), but also by a 1100 nm pump laser. A 1100/1450 CRR configured according to embodiments of the invention is shown in FIG. 5 as part of the optical fiber laser system arrangement 50.

The optical fiber laser system arrangement 50 includes an optical energy source such as the pump laser 14 having a pump wavelength ($\lambda_p$) of approximately 1100 nm. The pump laser 14 is connected to a cascaded Raman resonator (CRR) 12. The cascaded Raman resonator 12 includes the optical fiber 32 with an output region 34 and an input region 36. The output region 34 includes a pump reflector (e.g., high reflectance grating 42) written so that its maximum reflectance occurs at approximately 1100 nm.

According to embodiments of the invention, the output region 34 also includes another pump reflector, e.g., in the form of a high reflectance grating 45, written in the output region 34 so that its maximum reflectance occurs at a wavelength of approximately 1117 nm. It is the addition of the high reflectance grating 45 that allows the cascaded Raman resonator 12 to provide 1450 nm lasing for an input wavelength of 1117 nm (i.e., a 1117/1450 CRR).

The reflective gratings 44 written in the output region 34 correspond, at least roughly, to Raman-Stokes order wavelength shifts corresponding to maximum gain. Thus, for a 1100/1450 CRR, the reflective gratings 44 have center wavelengths of approximately 1175 nm, 1240 nm, 1310 nm and 1396 nm for theoretical maximum Raman scattering conversion efficiency. However, according to embodiments of the invention, one or more of the reflective gratings 44 do not correspond to maximum gain Raman-Stokes order wavelength shifts, but rather correspond to shifts that provide less than theoretically ideal but still conversion efficiency for the given application. More specifically, one or more of the gratings 44 are written within ±20 nm of the previously-mentioned center wavelengths.

The output region 34 also includes at least one low reflectance or transmissive grating 46 written to its maximum reflectance at approximately 1450 nm. However, according to an embodiment of the invention, the transmissive grating 46 is written, e.g., so that its maximum reflectance does not correspond to the gain maximum of the Raman-Stokes order wavelength shift (1450 nm). For example, grating 46 is written to have its maximum reflectance at 1450±20 nm.

The input region 36 includes a plurality of highly reflective gratings 52 written, e.g., to have center wavelengths of approximately 1175 nm, 1240 nm, 1310 nm and 1396 nm for theoretical maximum Raman scattering conversion efficiency. The input region 36 also includes a high reflectance grating 54 written so that the maximum reflection of the high reflectance grating occurs at approximately 1450 nm (i.e., $\lambda_n$). However, according to an embodiment of the invention, at least one of the gratings 52 and/or grating 54 is written, e.g., so that its maximum reflectance does not correspond to the gain maximum of the Raman-Stokes order wavelength shift (1450 nm). More specifically, one or more of the gratings 52, 54 are written within ±20 nm of the previously-mentioned center wavelengths.

As discussed previously herein, although one or more of the gratings 52 and 44 do not correspond to the gain maxima of the Raman-Stokes orders according to embodiments of the invention, the gratings should still match or complement their corresponding gratings. That is, gratings 52, 44 should still define optical cavities as before. For example, if a grating 44 in the output region 34 is written for maximum reflectance at, e.g., 1360 nm (instead of the theoretical 1366 nm), then the corresponding grating 52 in the input region 36 should likewise be written for maximum reflectance at 1360 nm. In this manner, the defined optical cavity needed for proper Raman scattering is maintained.

In operation, the optical fiber laser system arrangement 50 converts input light having at an input wavelength ($\lambda_p$) of 1100 nm to light having an output wavelength ($\lambda_n$) of 1450 nm, in a conventional manner. However, according to embodiments of the invention, the optical fiber laser system arrangement 50 also converts light having an input wavelength ($\lambda_p$) of 1117 nm to light having an output wavelength ($\lambda_n$) of 1450.

The advantageous realization according to embodiments of the invention also allows the writing of one or more of the Raman-Stokes order reflector grating pairs to vary based on the conversion frequency needed within the cascaded Raman resonator rather than solely on theoretical maximum gain Raman frequency shifts. Similarly, it is possible to vary the writing of the high reflectance pump reflectors and/or the low reflectance output reflectors depending on the needed conversion frequency instead of only theoretical maximum gain Raman frequency shifts.

Figure 6B:
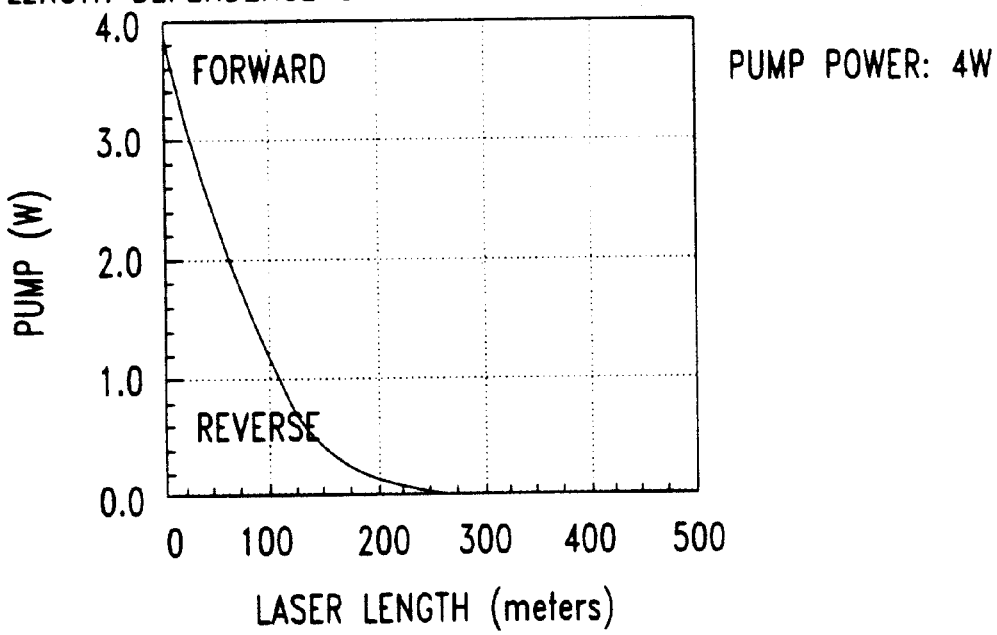
FIG. 6b is a graphical diagram of light action versus optical fiber length for low pump powers.
Figure 6B:
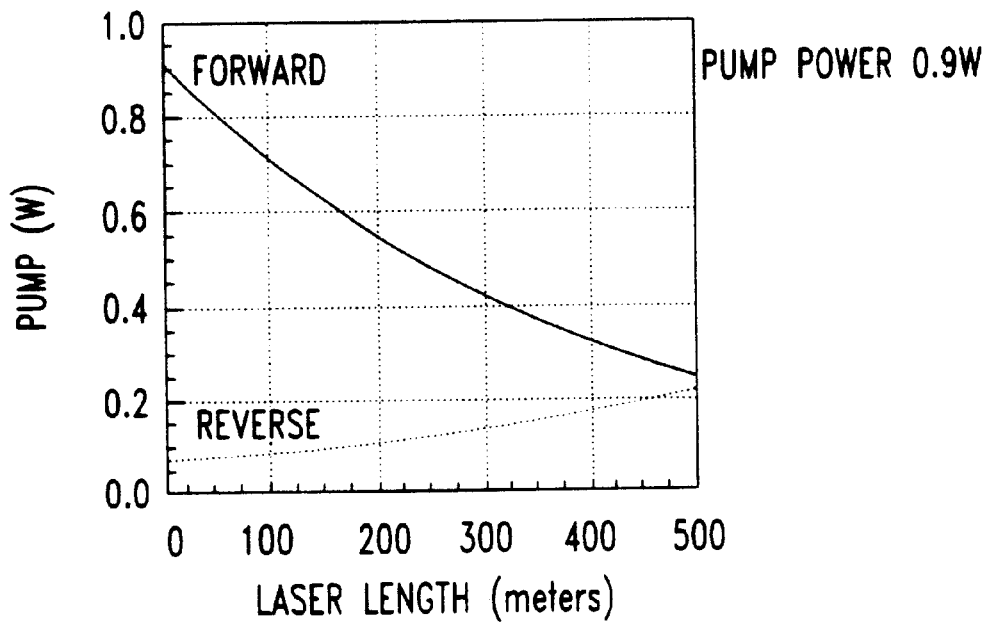

Referring now to FIGS. 6a–b, graphs of simulated pump absorption versus optical fiber length for various pump power intensities are shown. From the graph in FIG. 6a it can be seen that, for relatively high pump powers (e.g., pump powers greater than approximately 4 watts), most of the light practically is absorbed within, e.g., the first 100 meters of the optical fiber. Therefore, according to alternative embodiments of the invention, a pump reflector is not required when operating, e.g., at relatively high pump powers (e.g., greater than 4 watts). By comparison, as shown in FIG. 6b, it can be seen that, for lower pump powers, much of the light is not absorbed by the fiber, even after approximately 500 meters.

Figure 7:
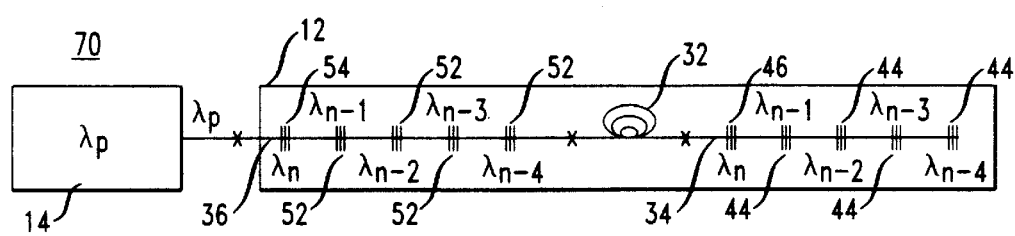
FIG. 7 is a simplified schematic diagram of an optical fiber laser system according to an alternative embodiment of the invention.

Referring now to FIG. 7, an optical fiber laser system arrangement 70 according to an alternative embodiment of the invention is shown. Specifically, the optical fiber laser system arrangement 70 combines the use of the cascaded Raman resonator 12 with a pump laser 14 that operates at relatively high pump powers (e.g., greater than 4 watts). As shown, the optical fiber laser system arrangement 70 includes an optical fiber 32 having an output region 34 and an input region 36. The output region 34 includes a plurality of gratings 44 written, e.g., to at least roughly correspond to the intermediate Stokes orders ($\lambda_{n-1}$, $\lambda_{n-2}$, $\lambda_{n-3}$ ... ). Similarly, the input region 36 includes a plurality of gratings 52 written, e.g., to at least roughly correspond to the intermediate Stokes orders ($\lambda_{n-1}$, $\lambda_{n-2}$, $\lambda_{n-3}$, ... ). Also, the input region 36 includes a highly reflective grating 54 whose maximum reflectance wavelength is approximately equal to the desired output wavelength $\lambda_n$.

However, according to this alternative embodiment of the invention, the cascaded Raman resonator 12 does not include a pump reflector. As discussed previously herein, for pump lasers 14 operating at high pump powers, (e.g, greater than approximately 4 watts) sufficient absorption occurs in the first hundred meters of the optical fiber such that a pump reflector often is not needed within the light conversion device. Accordingly, if the pump power is relatively low (e.g., less than approximately 4 watts), a pump reflector corresponding to the particular wavelength of the pump laser ($\lambda_p$) may have to be written at the output grating set.

The inventive cascaded Raman resonator arrangement 70 shown in FIG. 7 is compared with, e.g., the inventive arrangement 40 shown in FIG. 4, in which the cascaded Raman resonator 12 includes the pump reflector 42 written to have maximum reflectance at a wavelength of 1117 nm, and the inventive arrangement 50 shown in FIG. 5, in which the cascaded Raman resonator 12 includes the pump reflector 42 written to have maximum reflectance at a wavelength of 1100 nm.

Optical fiber laser system arrangements and devices according to embodiments of the invention are less complex and less expensive than conventional arrangements. Furthermore, the scaleable power features of arrangements according to embodiments of the invention offer additional flexibility.

It will be apparent to those skilled in the art that many changes and substitutions can be made. to the embodiments of the optical fiber laser system arrangements and devices herein described without departing from the spirit and scope of the invention as defined by the appended claims and their full scope of equivalents.

What is claimed is:

1. Apparatus for converting optical energy within an optical communications system including a source of optical energy having an input wavelength $\lambda_p$, wherein the optical energy is converted to an output wavelength $\lambda_n$ that is greater than the input wavelength $\lambda_p$, wherein said apparatus comprises:

an optical transmission medium coupled to the source of optical energy and having an input region and an output region;

at least one pair of gratings formed in said optical transmission medium that defines optical cavities for radiation of optical energy at said output wavelength $\lambda_n$, a first reflective grating formed in the output region of said optical transmission medium at a wavelength that provides maximum reflection of optical energy at a first input wavelength $\lambda_{p1}$.

a second reflective grating formed in the output region of said optical transmission medium at a wavelength that provides maximum reflection of optical energy at a second input wavelength $\lambda_{p2}$, wherein at least one of the first and second input wavelengths differs from the input wavelength $\lambda_p$, wherein at least one pair of the gratings is written in said optical transmission medium at a wavelength that does not correspond to the maximum gain for the Raman-Stokes order shift, wherein the optical energy is converted with less efficiency than if the gratings were written at wavelengths that correspond to the maximum gain for the Raman-Stokes order shifts, wherein maximum reflection efficiency occurs at wavelengths that correspond to Raman-Stokes order shifts, wherein the gratings in the output region of said optical transmission medium are disposed in sequence according to center wavelength, with center wavelengths decreasing with increasing distance from the input region, and wherein the defined optical cavities convert optical energy of the input wavelength $\lambda_p$ to optical energy having the output wavelength $\lambda_n$.

2. The apparatus as recited in claim 1, wherein the gratings at wavelengths not corresponding to the gain maxima of the Raman-Stokes order shifts are within approximately ±20 nm of wavelengths that correspond to the gain maxima of the Raman-Stokes order shifts.

3. The apparatus as recited in claim 1, further comprising at least one reflective grating formed in said optical transmission medium at a wavelength that provides reflection with less than maximum efficiency, wherein the wavelength of the reflective grating does not correspond to the gain maxima of the Raman-Stokes order shift of the input wavelength $\lambda_p$ but is within approximately ±20 nm of a wavelength that corresponds to the gain maxima of the Raman-Stokes order shift of the input wavelength $\lambda_p$.

4. The apparatus as recited in claim 1, wherein said optical transmission medium includes an input region and an output region, and wherein said at least one pair of gratings further comprises at least one grating written in said input region and a complementary grating written in said output region.

5. The apparatus as recited in claim 1, wherein said optical transmission medium is a silica-based optical fiber.

6. The apparatus as recited in claim 1, wherein at least one of said gratings is selected from the group consisting of Bragg gratings, etched gratings and in-line refractive index gratings.

7. A cascaded Raman resonator (CRR) for converting optical energy to an output wavelength $\lambda_n$, said cascaded Raman resonator (CRR) comprising:

an optical transmission medium for coupling to a source of optical energy having an input wavelength $\lambda_p$, said optical energy transmission medium including an input region and an output region;

a first reflective grating formed in the input region of said optical transmission medium, said first reflective grating corresponding to the output wavelength $\lambda_n$;

at least one second reflective grating formed in the input region of said optical transmission medium, said second gratings corresponding to the intermediate Raman-Stokes order shifts $\lambda_1, \lambda_2, \ldots, \lambda_n$, where $n \geq 2$;

at least one third reflective grating formed in the output region of said optical transmission medium, said third gratings corresponding to the intermediate Raman-Stokes order shifts $\lambda_1, \lambda_2, \ldots$, where $n \geq 2$, said third gratings complementing respective second gratings and forming grating pairs therewith in such a way that optical cavities are defined in said optical transmission medium for Raman scattering;

at least one transmissive grating written in the output region of said optical transmission medium at a wavelength that provides maximum reflectance of optical energy at the output wavelength $\lambda_n$, said transmissive grating complementing said first reflective grating and forming a grating pair therewith within said optical transmission medium, a fourth reflective grating formed in the output region of said optical transmission medium at a wavelength that provides maximum reflection of optical energy at a first input wavelength $\lambda_{p1}$, and a fifth reflective grating formed in the output region of said optical transmission medium at a wavelength that provides maximum reflection of optical energy at a second input wavelength $\lambda_{p2}$, wherein at least one of the first and second input wavelengths differs from the input wavelength $\lambda_p$, wherein the gratings in the output region of said optical transmission medium are disposed in sequence according to center wavelength, with center wavelengths decreasing with increasing distance from the input region, and wherein the gratings of at least one grating pair formed by a second reflective grating and the respective third reflective grating are written at wavelengths that do not correspond to the gain maxima of the Raman-Stokes order shifts, wherein the optical energy is converted with less efficiency than if said reflective gratings were written at wavelengths that correspond to the gain maxima of the Raman-Stokes order shifts.

8. The apparatus as recited in claim 7, wherein the gratings at wavelengths not corresponding to the gain maxima of the Raman-Stokes order shifts are written at wavelengths within approximately ±20 nm of wavelengths corresponding to the gain maxima of the Raman-Stokes order shifts.

9. The apparatus as recited in claim 7, further comprising at least one reflective grating formed in the output region of said optical transmission medium at a wavelength that provides reflection with less than maximum efficiency, wherein the wavelength of the reflective grating does not correspond to the gain maxima of the Raman-Stokes order shift of the input wavelength $\lambda_p$ but is within approximately ±20 nm of the gain maxima of the Raman-Stokes order shift of the input wavelength $\lambda_p$.

10. An optical communications system, comprising:

a source of optical energy having an input wavelength $\lambda_p$; and a cascaded Raman resonator optically coupled to said source, said cascaded Raman resonator having an input region and an output region, wherein said input region includes a reflective grating formed therein at a wavelength corresponding to an output wavelength $\lambda_n$, and at least one first reflective grating formed therein at wavelengths corresponding to the intermediate Stokes orders $\lambda_1, \lambda_2, \ldots, \lambda_n$, where $n > 2$, and wherein said output region includes at least one second reflective grating formed therein at wavelengths corresponding to the intermediate Stokes orders $\lambda_1, \lambda_2, \ldots, \lambda_n$, a third reflective grating formed in the output region of said optical transmission medium at a wavelength that provides maximum reflection of optical energy at a first input wavelength $\lambda_{p1}$, a fourth reflective grating formed in the output region of said optical transmission medium at a wavelength that provides maximum reflection of optical energy at a second input wavelength $\lambda_{p2}$, wherein at least one of the first and second input wavelengths differs from the input wavelength $\lambda_p$, and a transmissive grating formed therein at a wavelength corresponding to the output wavelength $\lambda_n$, wherein at least one pair of gratings formed by an input region grating and the corresponding output region grating is written at a wavelength that does not correspond to the gain maxima of the Raman-Stokes order shifts, wherein the gratings in the output region of said optical transmission medium are disposed in sequence according to center wavelength, with center wavelengths decreasing with increasing distance from the input region, and wherein the optical energy is converted with less efficiency than if the gratings were written at wavelengths that correspond to the gain maxima of the Raman-Stokes order shifts, wherein maximum reflection efficiency occurs at wavelengths that correspond to Raman-Stokes order shifts.

* * * * *